(12) United States Patent
Chang et al.

(10) Patent No.: US 8,841,007 B2
(45) Date of Patent: Sep. 23, 2014

(54) DATA MEDIA WITH TUNED THERMAL CONDUCTIVITY AND MAGNETIC PERMEABILITY

(75) Inventors: Kai-Chieh Chang, Pleasanton, CA (US); Yinfong Ding, Fremont, CA (US); Ganping Ju, Pleasanton, CA (US); Timothy Klemmer, Fremont, CA (US); Yukiko Kubota, Campbell, CA (US); Thomas P. Nolan, Fremont, CA (US); Yingguo Peng, San Ramon, CA (US); Jan-Ulrich Thiele, Sunnyvale, CA (US); Qihong Wu, Dublin, CA (US); Xiaobin Zhu, San Ramon, CA (US)

(73) Assignee: Seagate Technology LLC, Cupertino, CA (US)

( * ) Notice: Subject to any disclaimer, the term of this patent is extended or adjusted under 35 U.S.C. 154(b) by 62 days.

(21) Appl. No.: 13/458,808

(22) Filed: Apr. 27, 2012

(65) Prior Publication Data

US 2013/0288079 A1    Oct. 31, 2013

(51) Int. Cl.
*G11B 5/667*    (2006.01)
*G11B 5/73*     (2006.01)

(52) U.S. Cl.
CPC .............. *G11B 5/7325* (2013.01); *G11B 5/667* (2013.01)
USPC ...................................... 428/828.1; 428/831

(58) Field of Classification Search
None
See application file for complete search history.

(56) References Cited

U.S. PATENT DOCUMENTS

| | | | | |
|---|---|---|---|---|
| 7,862,914 B2 * | 1/2011 | Kubota et al. | ................. | 428/831 |
| 7,869,162 B2 * | 1/2011 | Lu et al. | ................. | 360/125.31 |
| 8,149,539 B2 * | 4/2012 | Lu et al. | ................. | 360/125.31 |
| 8,279,739 B2 * | 10/2012 | Kanbe et al. | ................. | 369/288 |
| 8,399,051 B1 * | 3/2013 | Hellwig et al. | ................. | 427/131 |
| 8,460,805 B1 * | 6/2013 | Gao et al. | ................. | 428/828.1 |
| 8,542,569 B2 * | 9/2013 | Kanbe et al. | ................. | 369/288 |
| 8,576,515 B2 * | 11/2013 | Hohlfeld et al. | ......... | 360/125.31 |
| 8,576,672 B1 * | 11/2013 | Peng et al. | ................. | 369/13.14 |
| 2005/0202287 A1 | 9/2005 | Lu et al. | | |
| 2006/0154110 A1 * | 7/2006 | Hohlfeld et al. | ............ | 428/823 |
| 2007/0026263 A1 | 2/2007 | Kubota et al. | | |
| 2011/0043941 A1 | 2/2011 | Champion et al. | | |
| 2011/0211428 A1 * | 9/2011 | Batra et al. | ................. | 369/13.33 |
| 2012/0092790 A1 * | 4/2012 | Hellwig et al. | ................. | 360/59 |
| 2014/0043947 A1 * | 2/2014 | Hohlfeld et al. | ............ | 369/13.4 |

OTHER PUBLICATIONS

Jianhui Wang, Sam Zhang, Huili Wang, Ping Xu, Dwight Iha and Steven Sawasaki, "Ruthenium Interlayer as Diffusion Barrier Under Carbon Overcoat in Magnetic Recording Media," Journal of Nanoscience and Nanotechnology, 2008, pp. 2613-2617, vol. 8, No. 5, American Scientific Publishers, US.

En Yang, Sutatch Ratanaphan, David E. Laughlin and Jian-Gang Zhu, "Highly Ordered FePt L10 Thin Films with Small Grains on RuAl Seed Layers," IEEE Transactions on Magnetics, Jan. 2011, pp. 81-86, vol. 47, No. 1, IEEE.

* cited by examiner

*Primary Examiner* — Kevin Bernatz
(74) *Attorney, Agent, or Firm* — Hall Estill Attorneys at Law

(57) ABSTRACT

Various magnetic stack embodiments may be constructed with a soft magnetic underlayer (SUL) having a first thickness disposed between a substrate and a magnetic recording layer. A heatsink may have a second thickness and be disposed between the SUL and the magnetic recording layer. The first and second thicknesses may each be tuned to provide predetermined thermal conductivity and magnetic permeability throughout the data media.

19 Claims, 5 Drawing Sheets

FIG. 1
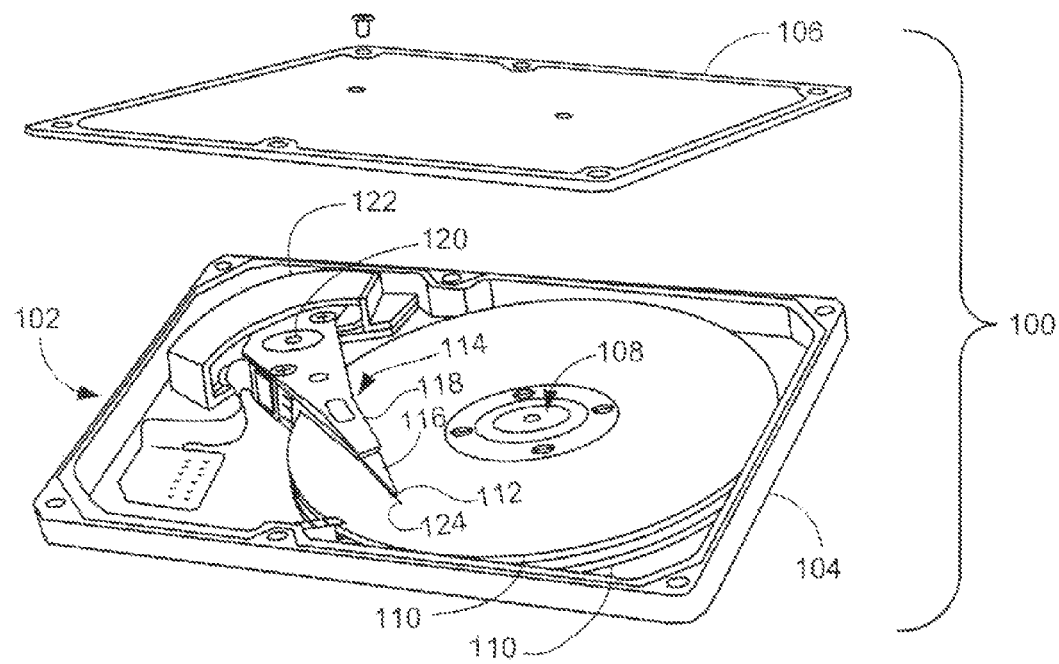
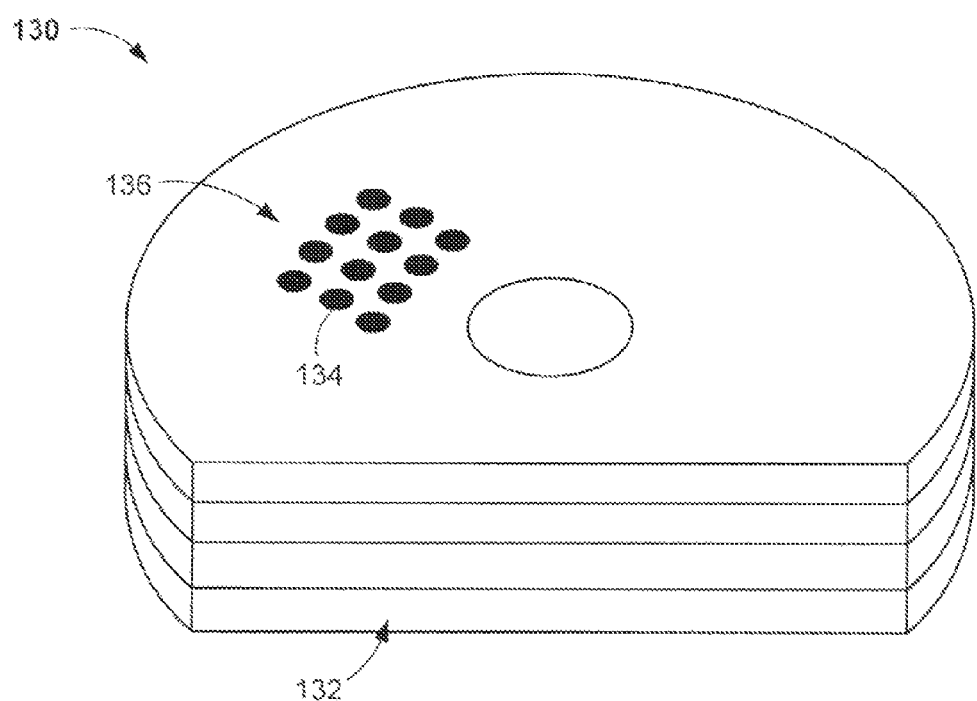
FIG. 2

FIG. 5A
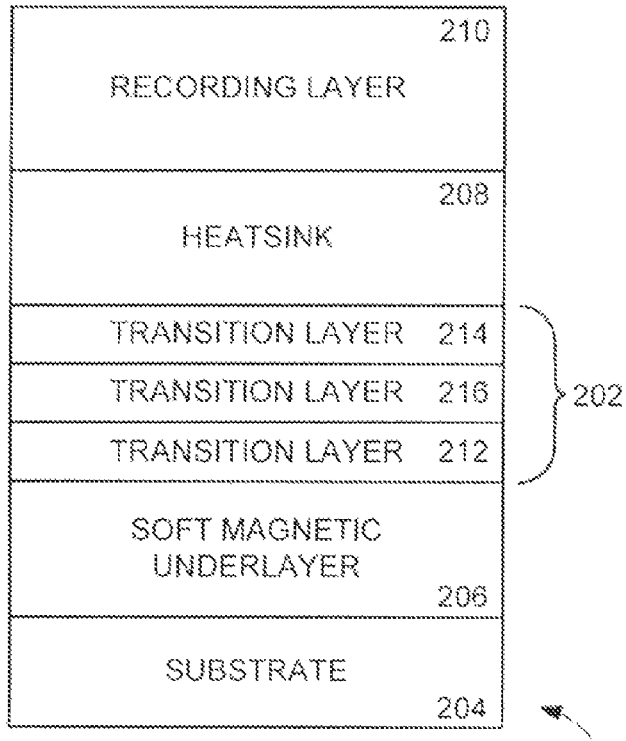
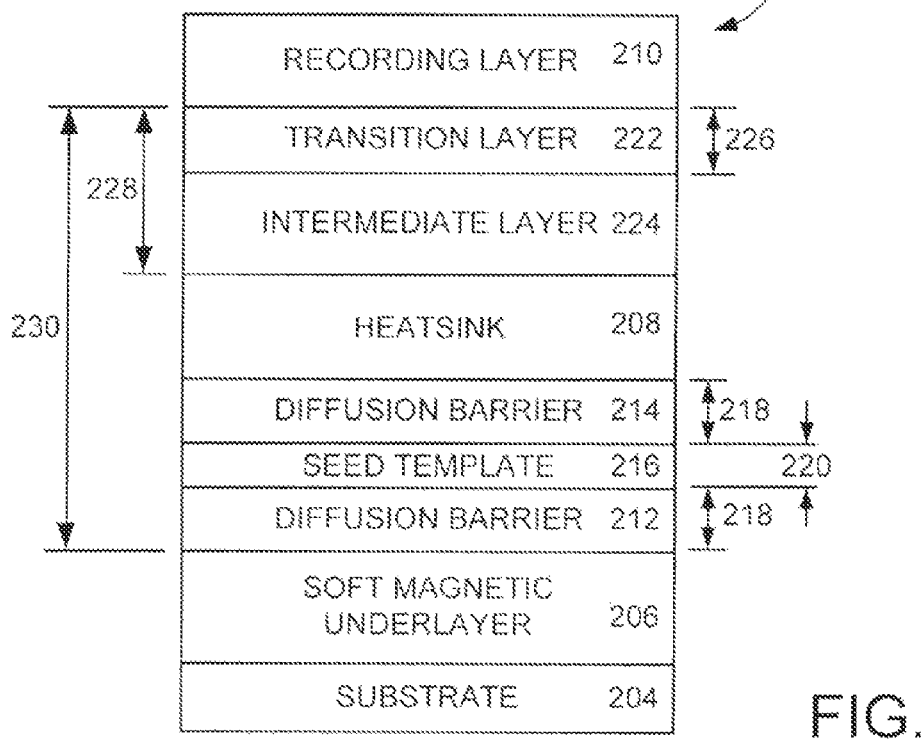
FIG. 5B

DATA MEDIA WITH TUNED THERMAL CONDUCTIVITY AND MAGNETIC PERMEABILITY

SUMMARY

A magnetic stack, such as a data storage media, may have a soft magnetic underlayer (SUL) having a first thickness disposed between a substrate and a magnetic recording layer. A heatsink may have a second thickness and be disposed between the SUL and the magnetic recording layer. The first and second thicknesses may each be tuned to provide predetermined thermal conductivity and magnetic permeability throughout the data media.

BRIEF DESCRIPTION OF THE DRAWINGS

FIG. 1 is a perspective view of an example data storage device.

FIG. 2 shows a partial cross-section of an example magnetic data storage media capable of being used in various embodiments.

FIGS. 5A and 5B illustrate cross-sectional block representations of example data storage media constructed in accordance with various embodiments.

DETAILED DESCRIPTION

Figure 3A:
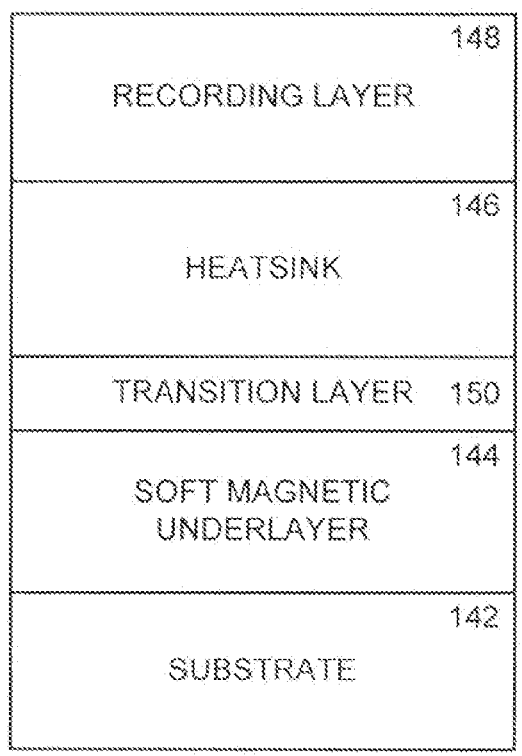
FIGS. 3A and 3B display cross-sectional block representations of example data storage media constructed in accordance with various embodiments.
Figure 3A:

Various embodiments of a tuned data media are generally disclosed herein. As industry focuses on reduced form factor data storage devices, demand for larger data capacity and faster data transfer rates elevates. Such performance may correspond to smaller data bits stored on a data media in shorter time while maintaining reliable data access. Inclusion of laser light to heat the data media and allow for rapid data recording has been proposed, but lacks an efficient manner of dissipating heat after data is written, which decreases potential data areal density and data transfer times. Hence, there is an increasing industry need to optimize data media to provide efficient control of thermal energy while maintaining magnetic operation conducive to high capacity data storage devices.

Accordingly, embodiments of the present disclosure configure data media with a soft magnetic underlayer (SUL) that has a first thickness and is disposed between a substrate and a magnetic recording layer. A heatsink may have a second thickness and be disposed between the SUL and the magnetic recording layer. The heatsink can be separated from the SUL by a first transition layer and the first and second thicknesses may each be tuned to provide predetermined thermal conductivity and magnetic permeability throughout the data media. The tuning of thermal and magnetic profiles of the data media can provide improved performance by maximizing effective magnetic write and saturation field gradients that allows for higher areal density and signal-to-noise ratio.

While the various embodiments of a data media are illustrated in hard disk environments, such configuration is not required or limiting. One such non-limiting environment is shown in FIG. 1, which provides an example data storage device 100 in which various embodiments of the present invention can be practiced. The device 100 includes a substantially sealed housing 102 formed from a base deck 104 and top cover 106. An internally disposed spindle motor 108 is configured to rotate a number of data storage media 110. The media 110 are accessed by a corresponding array of data transducers (read/write heads) that are each supported by a head gimbal assembly (HGA) 112.

Each HGA 112 can be supported by a head-stack assembly 114 ("actuator") that includes a flexible suspension 116, which in turn is supported by a rigid actuator arm 118. The actuator 114 may pivot about a cartridge bearing assembly 120 through application of current to a voice coil motor (VCM) 122. In this way, controlled operation of the VCM 122 causes the transducers (numerically denoted at 124) to align with tracks (not shown) defined on the media surfaces to store data to the data storage media or retrieve data therefrom.

FIG. 2 generally illustrates a partial cross-sectional view of an individual example data storage media 130 constructed and capable of being used in various embodiments. The media 130 may be constructed of any number of layers 132 that may be common or dissimilar materials and thicknesses configured to collectively provide data media operation, such as perpendicular magnetic recording. In various embodiments, media operation consists of programming data bits to predetermined regions 134, such as bit patterned media. Such predetermined regions 134 can also correspond to thermal areas where the media surface 136 is heated to temporarily reduce magnetic coercivity in one or more media layers 132 and reduce data bit programming time and space, such as in heat assisted magnetic recording (HAMR) scheme.

The ability to configure the media 130 with a variety of layers 132 to reduce the size of the predetermined regions 134 can allow for tuned magnetic operation with increased areal density and signal-to-noise ratio. However, as the regions 134 reduce in size, data stability in heightened data transfer rates can struggle due to inefficient dissipation of thermal energy within the media. In other words, the media 130 may have reduced data reliability as thermal energy is inadvertently retained. Thus, maintaining data reliability while reducing the size of the predetermined regions 134 can be optimized with increased ability to dissipate thermal energy quickly and precisely.

Figure 3B:
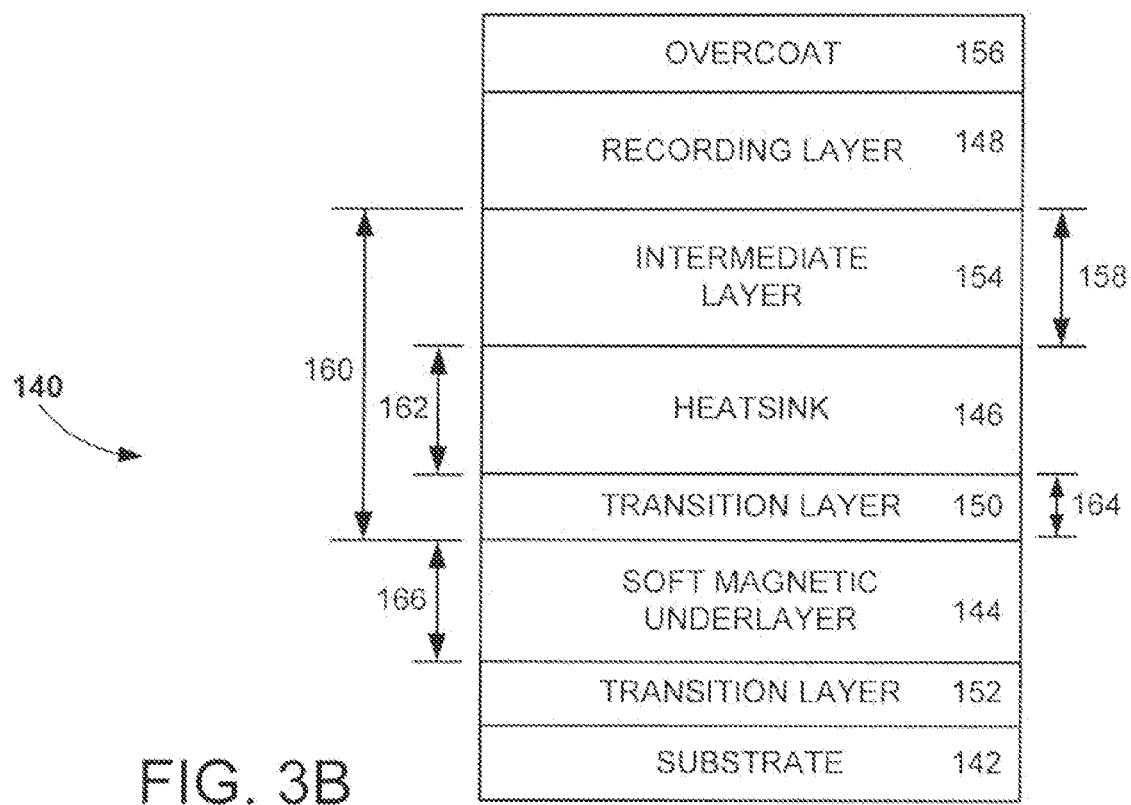

FIGS. 3A and 3B provide cross-sectional block representations of an example data media 140 configured in accordance with various embodiments. The data media 140 can be formed on an unlimited number and type of substrate 142 that may facilitate the growth of a plurality of stacked layers. As shown in FIG. 3A, a soft magnetic underlayer (SUL) 144 is contactingly adjacent the substrate 142 and can be configured with a variety of materials, such as FeCoB, FeTaC, and FeCoTaZr, that provide a magnetic path that assists the reversal of data bit magnetization. Such materials, however, can have poor thermal conductivity, which may limit the ability to dissipate heat in fast data access operations for reduced size data bits. Accordingly, a heatsink 146 can be positioned between the magnetic recording layer 148 and the SUL 144 to efficiently control heat while allowing a magnetic flux pathway between the recording layer 148 and the SUL 144.

The configuration of the heatsink 146 is unlimited and can be positioned in direct contact with the SUL 144 or be separated by a transition layer 150, which may be formed as an amorphous or crystalline material. The addition of the transition layer 150 can provide material that aids the construction and operation of the heatsink 146. For example, the transition layer 150 can be a seed layer, a diffusion barrier, and a non-magnetic spacer layer that is tuned to provide predetermined thermal and magnetic characteristics throughout the data media 140.

FIG. 3B displays the data media 140 with additional layers that can be tuned to provide predetermined data storage operation. As generally illustrated, a second transition layer 152 may be disposed between the SUL 144 and the substrate 142 to provide any number of seed, diffusion, and spacer functions that may be the same, or unique, compared to the first transition layer 150. Regardless of the number and composition of transition layers 150 and 152, one or more intermediate layers 154 can be formed between the heatsink 146 and the magnetic recording layer 148. The recording layer 148 can further contact a protective overcoat 156 that aids in reducing wear and trauma on various data bits stored in the recording layer 148.

The intermediate layers can serve a variety of functions that can be tuned to provide the recording layer 148 with a predetermined composition, such as 5-10 nm of FePtX, positioned predefined distances 158 and 160 from the heatsink and SUL, respectively. By controlling not only the intermediate layer thickness 158 but also the heatsink thickness 162, first transition layer thickness 164, and SUL thickness 166, the data media 140 can be optimized with a balance between heat dissipation with the heatsink 146 and magnetic flux response with the SUL 144.

The ability to tune the configuration of the various layers of the data media 140 allows for optimized operational thermal conductivity and magnetic permeability profiles that can be tailored to correspond with data recording means, such as magnetic transducing heads. The configurability of the data media 140 further allows for the data media to be constructed to accommodate a wide range of thermal and magnetic profiles that provide varying data transfer rates and data bit areal densities. That is, the thicknesses and distances within the data media can be constructed to position the SUL 144 as close as possible to the magnetic recording layer 148 while having predetermined heat dissipation from the heatsink 146.

Figure 4A:
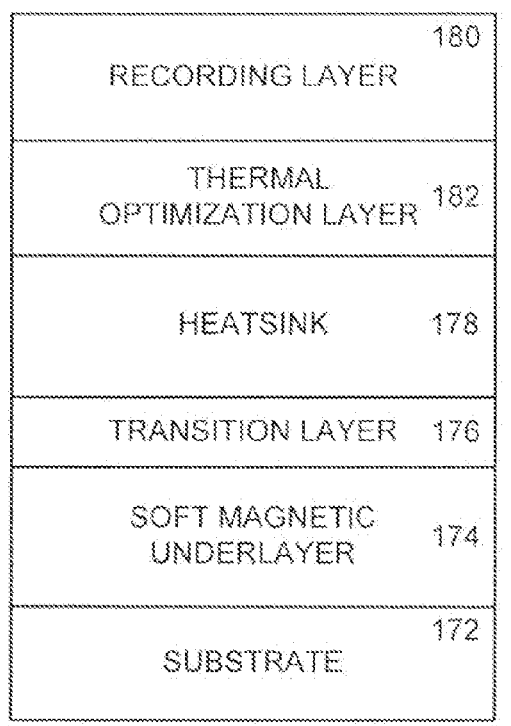
FIGS. 4A and 4B provide cross-sectional block representations of example data storage media capable of being used in various embodiments.
Figure 4B:
Figure 4B:
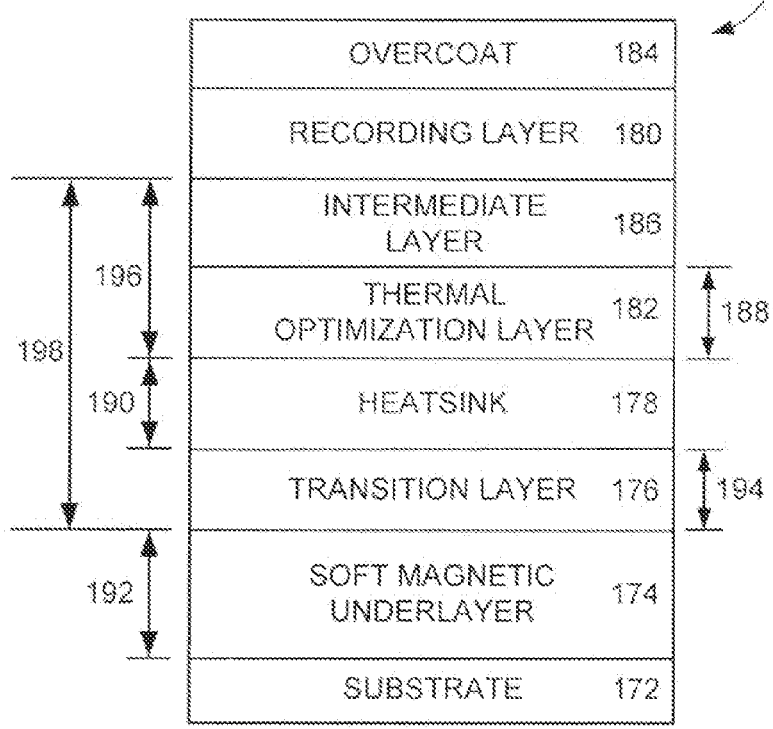

The configurability of the data media 140 can be further expanded with additional layers that increase the ability to control thermal conductivity and magnetic permeability. FIGS. 4A and 4B show cross-sectional block representations of an example data media 170 constructed in accordance with various embodiments. The data media 170 has a substrate 172, SUL 174, first transition layer 176, heatsink 178, and recording layer 180 similar to the data media 140 of FIGS. 3A and 3B, but with the addition of a thermal optimization layer 182, as displayed in FIG. 4A. While not required or limited, the thermal optimization layer 182 is coupled directly to the heatsink 178 and its material, such as SiN, is elected to act as a thermal resistor to tune the thermal energy saturation profile through the media 170.

FIG. 4B illustrates how the thermal optimization layer 182 can be implemented with a variety of other layers to tune the orientation of the magnetic recording layer 180 to the heatsink 178 and SUL 174. The magnetic recording layer 180 can be protected by an overcoat 184 on a first side and coupled directly to one or more intermediate layers 186 on an opposite second side. As discussed in relation to FIG. 3B, the intermediate layer(s) 186 can be formed with predetermined materials and thicknesses that position the heatsink 178 and SUL 174 in relation to the magnetic recording layer 180.

Similarly, the thermal optimization layer 182 can be constructed with a thickness 188 that complements the heatsink thickness 190, SUL thickness 192, and transition layer thickness 194 to position the heatsink 178 and SUL 174 predetermined respective distances 196 and 198 from the recording layer 180. With regard to the SUL thickness 192, the distance 198 to the recording layer 180 may be increased without affecting magnetic permeability in the event the intermediate layer 186 is configured as a nonmagnetic material. However, the distance 196 from the heatsink 178 to the recording layer 180 can directly correspond to magnetic properties of the media 170 due at least in part to the reflective and optical spreading.

Such thermal optimization layer 182 construction can further provide material that controls heat dissipation by the heatsink 178 and thermal conductivity throughout the data media 170. With the thermal optimization layer 182 coupled to the heatsink 178, thermal energy can be controlled to provide a variety of operational characteristics, such as thermal field gradient and temperature gradient, that allows for optimized balance between thermal dissipation and magnetic flux permeability through the data media 170 to provide increased areal density.

FIGS. 5A and 5B provide additional cross-sectional block representations of embodiments of a data media 200 with a multi-layer transition structure 202. While not required, the data media 200 has a substrate 204 onto which an SUL 206, heatsink 208 and magnetic recording layer 210 are formed. As displayed in FIG. 5A, the transition structure 202 has a plurality of transition sub-layers 212, 214, and 216 positioned between the heatsink 208 and SUL 206. The number, composition, and thickness of the transition sub-layers 212, 214, and 216 can be tuned to any number of materials to provide predetermined thermal conductivity and magnetic permeability throughout the data media 200.

By disposing the heatsink 208 between the recording layer 210 and the SUL 206, the small magnetic permeability of various heatsink materials, such as Ag, Au, and Cu, allows for the efficient conduction of predetermined amounts of heat. In contrast, if the heatsink 208 were positioned farther from the SUL 206 than the recording layer 210, the poor thermal conductivity of many soft magnetic materials could impair the heat dissipation and magnetic saturation of the media 200. Hence, the optimized balance of heat dissipation and magnetic flux provided by the tuned configuration of the recording layer 210, heatsink 208, and SUL 206 can provide increased write field gradient that may correspond with strong signal-to-noise ratio.

In some embodiments, one or more of the transition sub-layers 212, 214, and 216 are configured as diffusion barriers. A diffusion barrier can be tuned to decrease the interdiffusion of atoms between media layers, such as between the heatsink 208 and SUL 206, during manufacture. While not required, materials like MgO, Rh, Ru, TiN, TiC, TiCn, TiPd, TaC, TaN, TaCN, W, borides, and nitrides can each provide characteristics after annealing that allow the transition structure 202 to be tuned through material and thickness selection to provide the predetermined thermal conductivity and magnetic permeability profile through the data media 200.

The transition sub-layers 212, 214, and 216 can be individually or collectively configured as seed templates that provide increased particle separation in the recording layer 210. The seed templates can be any number of layers and materials, but may be a multi-layer combination of seed materials, such as Ru, first grown coherently on chromium to form a film with a predetermined particle orientation and secondly grown coherently at an increased pressure to form a nano-rough template. Such successive seed layer growth can provide tuned grain separation that may enable high data density data bit formation once the recording layer 210 is deposited thereupon.

It should be noted that the various embodiments employing diffusion barriers and seed templates are not exclusive and can be combined. For example, at least one transition sub-layer 212, 214, and 216 may be configured with a seed template sub-layer positioned adjacent one or more diffusion barrier sub-layers. The combination of diffusion barriers and seed templates can add tunable features that can aid in providing the predetermined thermal conductivity and magnetic permeability profiles throughout the data media 200.

The use of multiple transition sub-layers can further allow for tuning of the position of the heatsink 208 and SUL 206 in relation to the magnetic recording layer 210. FIG. 5B illustrates an embodiment where first and second transition sub-layers 212 and 214 are configured as diffusion barriers with common thicknesses 218 and a third transition sub-layer 216 is configured as a seed template with a dissimilar thickness 220 compared to the diffusion barriers 212 and 214. The varying thicknesses 218 and 220 can be tuned to complement a transition layer 222 formed between the recording layer 210 and at least one intermediate layer 224 having a thickness 226 to provide predetermined layer spacing and distances 228 and 230 from the recording layer 210 to the heatsink 208 and SUL 206, respectively.

While the various transition layers and sub-layers can be configured as generally illustrated in FIGS. 3B, 4B, and 5B, none of the embodiments are required or limiting as transition material can be positioned in any portion of a data media to provide predetermined spacing between layers and operational characteristics that can be tuned with transition layer thickness and material selection. For example, a seed template can be used in one portion of a data media with a thickness that corresponds with a non-magnetic transition layer in a different portion of the media to position the heatsink and SUL preselected distances from the magnetic recording layer to balance thermal energy and magnetic flux saturation to provide a predetermined write field gradient through the data media.

Figure 6:
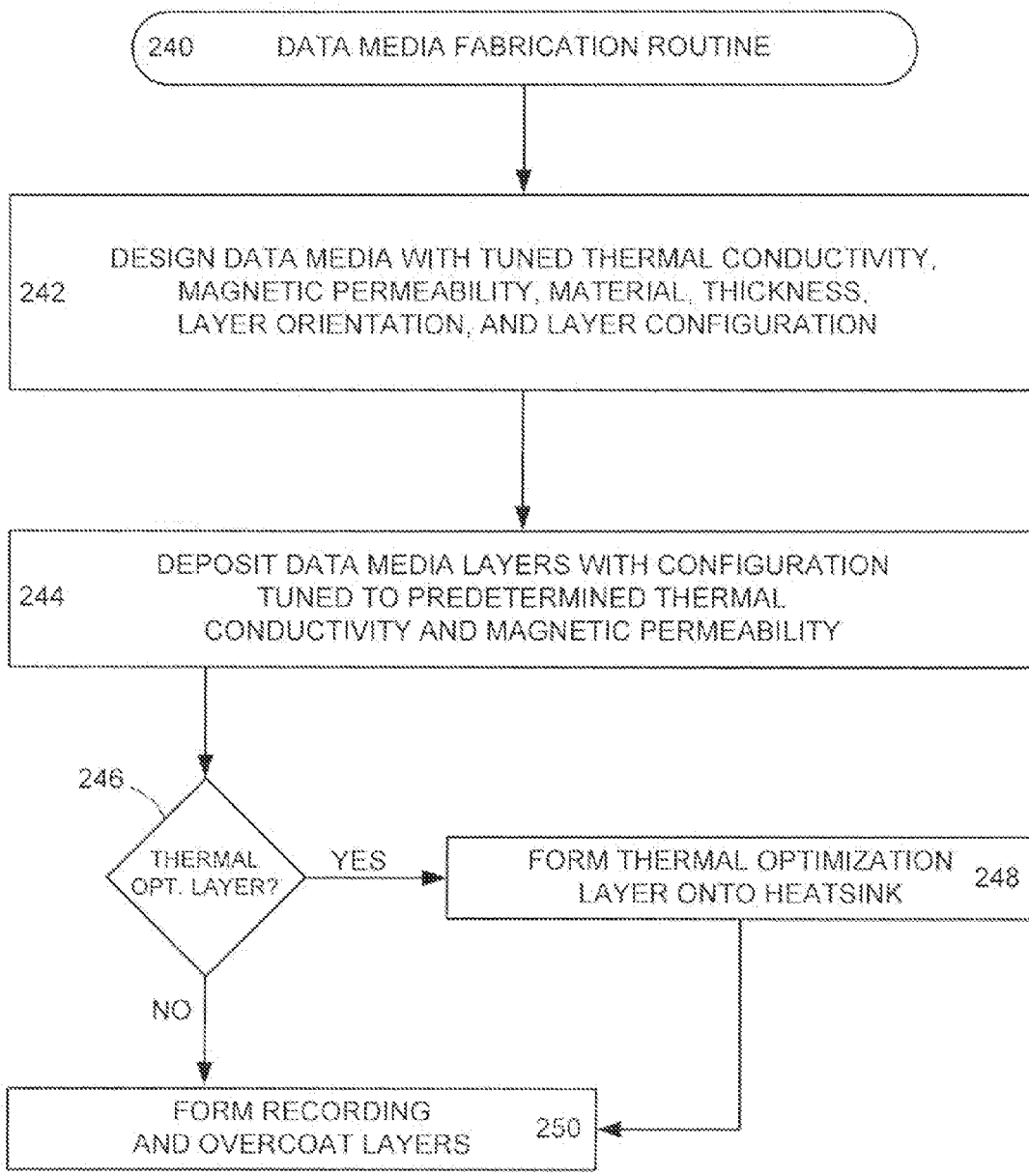
FIG. 6 provides a flowchart of an example data media fabrication routine carried out in accordance with various embodiments.

As such, the selection and design of a data media can undergo a series of determinations directed at tuning and optimizing the thermal conductivity and magnetic permeability profile of the data media during operation. FIG. 6 provides an example flowchart of a data media fabrication routine 240 conducted in accordance with various embodiments. The routine 240 may begin with any number and type of design decisions, in the embodiment of FIG. 6, step 242 evaluate and determine the thermal conductivity and magnetic permeability profiles to be exhibited by the data media.

Step 242 further tunes the material and thickness configuration of at least the heatsink and SUL, respectively. With the design determinations of step 242, the main instruments of thermal conductivity and magnetic permeability throughout the data media are determined with the results, such as the material of the heatsink and thickness of the SUL, directing how the data media will operate. The position of the heatsink between the magnetic recording layer and SUL, as shown in FIGS. 3A-5B, allow for the tuning of heatsink to balance heat dissipation with magnetic flux permeability to provide the designed thermal conductivity and magnetic permeability chosen in step 242.

The data media design of step 242 may also determine the number and type of transition layers, which can evaluate numerous different criteria, such as if a seed layer can aid in growing the next layer and if interdiffusion is likely. Media design can continue to position the transition layers throughout the data media to provide predetermined distances between the recording layer, heatsink, and SUL, as shown in FIG. 3B.

With the various layers designed and tuned in step 242, step 244 deposits the layers on a substrate with a configuration that provides the predetermined thermal conductivity and magnetic permeability. It should be noted that the layers can be formed in step 244 successively or collectively with or without the substrate remaining as part of the data media. In some embodiments, step 244 deposits layers up to the heatsink before an evaluation of the thermal and magnetic design is next conducted in decision 246 to determine if a thermal optimization layer is to be coupled to the heatsink. In the event a thermal optimization layer is chosen, step 248 forms the layer with preselected materials and thickness. Subsequent to step 248 or if no thermal optimization layer is to be constructed, step 250 forms the magnetic recording layer and any protective overcoat layers on the existing data media stack.

With routine 240, a wide variety of data media can be constructed with structure tuned to provide predetermined operational characteristics, such as thermal conductivity and magnetic permeability that foster high saturation and write field gradient. The routine 240, however, is not limited only to the steps and decisions provided in FIG. 6 as any number of steps and determinations can be added, omitted, and modified to accommodate the fabrication of a precisely tuned data media. For example, decision 246 can be conducted prior to step 244 so that step 244 forms the entire data media without pause for evaluation of the thermal optimization layer.

The various configurations and material characteristics of the data media described in the present disclosure may allow for increased data recording through higher areal density and signal-to-noise ratio. The combination of media adapted to magnetic writing, such as incorporation of an SUL, with the aspects of media adapted to thermal writing, such as incorporation of the heatsink, can be balanced in terms of the magnetic permeability and thermal conductivity to provide a practical media lamination. As such, the SUL can be positioned distal the recording layer, opposite the heatsink and thermal optimization layer, which corresponds to high data bit density magnetic recording that allows for HAMR spot sizes of 50 nm and below.

The ability to tune and optimize each layer to provide a predetermined thermal conductivity and magnetic permeability may allow for the creation of data media precisely tailored to operate with predetermined behavior. Tuning the various layers with varying materials, such as diffusion barriers, seed templates, and non-magnetic spacers, can further provide thermal and magnetic operation catered to a wide range of data recording devices.

It is to be understood that even though numerous characteristics and configurations of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. A magnetic stack comprising:
   a magnetic recording layer;
   a soft magnetic underlayer (SUL) disposed between a substrate and the magnetic recording layer;

a heatsink disposed between the SUL and the magnetic recording layer and having a first thermal conductivity to dissipate heat from a heat assisted magnetic recording (HAMR) module used to write data to the magnetic recording layer, the heatsink further having a non-zero magnetic permeability;

a transition layer disposed between the heatsink and the SUL configured as a diffusion barrier layer to reduce interdiffusion of atoms between the SUL and the heatsink; and a thermal optimization layer disposed between the heatsink and the magnetic recording layer configured as a thermal resistor having a second thermal conductivity which tunes a thermal energy saturation through the magnetic stack.

2. The magnetic stack of claim 1, wherein the thermal optimization layer is contactingly disposed on the heatsink.

3. The magnetic stack of claim 1, wherein the transition layer is a multi-layer transition structure comprising a seed template disposed between first and second diffusion layers.

4. The magnetic stack of claim 1, further comprising a second transition layer which separates the substrate from the SUL.

5. The magnetic stack of claim 1, wherein the transition layer is an amorphous material.

6. The magnetic stack of claim 1, wherein the transition layer is a non-magnetic spacer layer which establishes an overall separation distance between the SUL and the heatsink.

7. The magnetic stack of claim 1, wherein the thermal optimization layer comprises SiN.

8. The magnetic stack of claim 1, wherein the second thermal conductivity is lower than the first thermal conductivity.

9. The magnetic stack of claim 1, further comprising at least one intermediate layer is contactingly disposed between the magnetic recording layer and the thermal optimization layer.

10. The magnetic stack of claim 1, wherein the heatsink has a first thickness and the SUL has a different second thickness.

11. A perpendicular magnetic recording medium comprising:

a substrate;

a soft magnetic underlayer (SUL) supported by the substrate;

a transition layer supported by the SUL;

a heatsink layer supported by the transition layer and having a non-zero magnetic permeability, wherein the transition layer is a diffusion barrier layer configured to reduce interdiffusion of atoms between the SUL and the heatsink layer;

a thermal optimization layer supported by the heatsink layer comprising SiN; and a recording layer supported by the thermal optimization layer and formed of a continuous layer of magnetic material having a uniform thickness in a direction perpendicular to a recording surface of the medium, wherein the SUL, transition layer, heatsink layer, thermal optimization layer and recording layer form a magnetic stack configured, responsive to heat assisted magnetic recording (HAMR) of the recording layer using a thermal spot size of 50 nm or less, to dissipate heat in accordance with a predetermined thermal profile through the magnetic stack.

12. The medium of claim 11, wherein the thermal optimization layer is contactingly disposed on the heatsink between the heatsink and the recording layer.

13. The medium of claim 11, wherein the transition layer is a multi-layer transition structure comprising a seed template disposed between first and second diffusion layers.

14. The medium of claim 11, further comprising a second transition layer disposed between the SUL and the substrate.

15. The medium of claim 11, wherein the transition layer is an amorphous material.

16. The medium of claim 11, wherein the transition layer is a non-magnetic spacer layer which establishes an overall separation distance between the SUL and the heatsink.

17. The medium of claim 11, wherein the heatsink has a first relatively higher thermal conductivity to dissipate heat from the HAMR module and the thermal optimization layer has a second relatively lower thermal conductivity to impede said dissipation of heat through the heatsink layer.

18. The medium of claim 11, wherein the transition layer comprises MgO, Rh, Ru, TiN, TiC, TiCN, TiPd, TaC, TaN, TaCN or W.

19. The medium of claim 11, in combination with a data transducer comprising a write element adapted to apply magnetic flux to the magnetic stack to write data to the magnetic recording layer and said HAMR module which applies said dots to the magnetic stack adjacent the applied magnetic flux.

\* \* \* \* \*

UNITED STATES PATENT AND TRADEMARK OFFICE
CERTIFICATE OF CORRECTION

PATENT NO. : 8,841,007 B2  Page 1 of 1
APPLICATION NO. : 13/458808
DATED : September 23, 2014
INVENTOR(S) : Kai-Chieh Chang et al.

It is certified that error appears in the above-identified patent and that said Letters Patent is hereby corrected as shown below:

In the Title Page:

Item (75) Inventors
replace "Yinfong Ding"
with "Yinfeng Ding"

Signed and Sealed this
Twelfth Day of May, 2015

Michelle K. Lee
*Director of the United States Patent and Trademark Office*